United States Patent
Tessarolo

(10) Patent No.: US 7,590,677 B2
(45) Date of Patent: Sep. 15, 2009

(54) PROCESSOR WITH SUMMATION INSTRUCTION USING OVERFLOW COUNTER

(75) Inventor: Alexander Tessarolo, Sydney (AU)

(73) Assignee: Texas Instruments Incorporated, Dallas, TX (US)

( * ) Notice: Subject to any disclaimer, the term of this patent is extended or adjusted under 35 U.S.C. 154(b) by 549 days.

(21) Appl. No.: 10/349,224

(22) Filed: Jan. 22, 2003

(65) Prior Publication Data

US 2003/0172100 A1    Sep. 11, 2003

Related U.S. Application Data

(60) Provisional application No. 60/363,476, filed on Mar. 11, 2002.

(51) Int. Cl.
  G06F 7/38    (2006.01)
  G06F 7/50    (2006.01)
(52) U.S. Cl. ..................... 708/490; 708/709
(58) Field of Classification Search .............. 708/490, 708/513, 670, 700, 709
See application file for complete search history.

(56) References Cited

U.S. PATENT DOCUMENTS 4,481,605 A * 11/1984 Chase ................ 708/274
5,241,493 A * 8/1993 Chu et al. ............ 708/501
5,757,685 A * 5/1998 Ohuchi ................ 708/490
6,523,057 B1 * 2/2003 Savo et al. ........... 708/706

FOREIGN PATENT DOCUMENTS

JP    100493345 A *   2/1998

OTHER PUBLICATIONS

TMS320C28X DSP CPU and Instruction Set Reference Guide, Aug. 2001, pp. 1-695, Texas Instruments, Inc., U.S:A.

* cited by examiner

*Primary Examiner*—Chuong D Ngo
(74) *Attorney, Agent, or Firm*—Robert D. Marshall, Jr.; Wade J. Brady, III; Frederick J. Telecky, Jr.

(57) ABSTRACT

Performing a sum of numbers operation in a variable bit-length environment of a processor in response to a summation instruction, comprising a) adding a least significant portion (LSP) of a first number to a LSP of another number from a plurality of numbers, wherein the sum is stored in a first storage location; b) incrementing an overflow counter if a carry is generated by adding the LSPs of the two numbers; c) adding a LSP of a next number from the plurality of numbers to the sum stored in the first storage location, wherein the resulting sum is stored back into the first storage location; d) incrementing the overflow counter if a carry is generated by adding the LSP of the next number to the sum in the first storage location; e) performing steps c) and d) until each of the LSPs of the plurality of numbers has been added.

18 Claims, 2 Drawing Sheets

PROCESSOR WITH SUMMATION INSTRUCTION USING OVERFLOW COUNTER

This application claims priority under 35 USC §119(e)(1) of Provisional Application No. 60/363,476, filed Mar. 11, 2002.

TECHNICAL FIELD OF THE INVENTION

This invention relates generally to processor operations and more particularly to calculating a sum of numbers in an environment exceeded by the numbers in bit-size using an overflow counter.

BACKGROUND OF THE INVENTION

In a 32-bit environment, sums of 64-bit numbers are typically calculated according to the following algorithm. The least significant thirty-two bits of the first 64-bit number are added to the least significant thirty-two bits of the second 64-bit number. The resulting sum includes a carry (which includes either a one or a zero) and the least significant thirty-two bits of a first 64-bit intermediate sum. The carry and the most significant thirty-two bits of the second 64-bit number are then added to the most significant thirty-two bits of the first 64-bit number, and the resulting sum includes the most significant thirty-two bits of the first 64-bit intermediate sum. The least significant thirty-two bits of the first 64-bit intermediate sum are then added to the least significant thirty-two bits of the third 64-bit number, and the resulting sum includes a carry and the least significant thirty-two bits of a second 64-bit intermediate sum. The carry and the most significant thirty-two bits of the third 64-bit number are then added to the most significant thirty-two bits of the first 64-bit intermediate sum, and the resulting sum includes the most significant thirty-two bits of the second 64-bit intermediate sum. The least significant thirty-two bits of the second 64-bit intermediate sum are then added to the least significant thirty-two bits of the fourth 64-bit number, and the resulting sum includes a carry and the least significant thirty-two bits of a third 64-bit intermediate sum. The carry and the most significant thirty-two bits of the fourth 64-bit number are then added to the most significant thirty-two bits of the second 64-bit intermediate sum, and the resulting sum includes the most significant thirty-two bits of the third 64-bit intermediate sum. This continues until the least and most significant thirty-two bits of the final 64-bit number are added to the least and most significant thirty-two bits of the preceding 64-bit intermediate sum, respectively. The final resulting sums include the least and most significant thirty-two bits of the sum of the 64-bit numbers. A drawback of such an algorithm is that two 32-bit registers are typically required to store the 64-bit intermediate sums, which may adversely affect processor performance and operation efficiency.

SUMMARY OF THE INVENTION

Particular embodiments of the present invention may reduce or eliminate disadvantages and problems traditionally associated with calculating a sum of a plurality of numbers in an environment exceeded by the numbers in bit-size using an overflow counter.

In one embodiment of the present invention, logic for calculating a sum of numbers using an overflow counter in an environment exceeded by the numbers in bit-size accesses a least significant portion of a first number of multiple numbers, accesses a least significant portion of a second number of the multiple numbers, and adds the least significant portion of the first number to the least significant portion of the second number. The resulting sum includes a first intermediate number. If a carry is generated by the addition of the least significant portion of the first number to the least significant portion of the second number, the logic accesses an overflow counter and increments the overflow counter to record the generated carry. The logic accesses each of multiple least significant portions of the remaining multiple numbers, adds each of the multiple least significant portions to the first intermediate number, and accesses and increments the overflow counter each time a carry is generated to record the generated carry. After each of the multiple least significant portions has been added to the first intermediate number, the logic stores the first intermediate number. The first intermediate number includes a least significant portion of the sum of the multiple numbers. The logic accesses a most significant portion of the first number and adds the overflow counter to the most significant portion of the first number. The resulting sum includes a second intermediate number. The logic accesses each of multiple most significant portions of the remaining multiple numbers and adds each of the multiple most significant portions to the second intermediate number. After each of the multiple most significant portions has been added to the second intermediate number, the logic stores the second intermediate number. The second intermediate number includes a most significant portion of the sum of the multiple numbers.

Particular embodiments of the present invention may provide one or more technical advantages. In particular embodiments, a sum of numbers may be calculated in an environment exceeded by the numbers in bit-size using a single register and an overflow counter, which may improve processor performance and operation efficiency. Certain embodiments may provide one or more other technical advantages which may be readily apparent to those skilled in the art from the figures, descriptions, and claims included herein.

BRIEF DESCRIPTION OF THE DRAWINGS

To provide a more complete understanding of the present invention and the features and advantages thereof, reference is made to the following description, taken in conjunction with the accompanying drawings, in which.

DESCRIPTION OF EXAMPLE EMBODIMENTS

Figure 1:
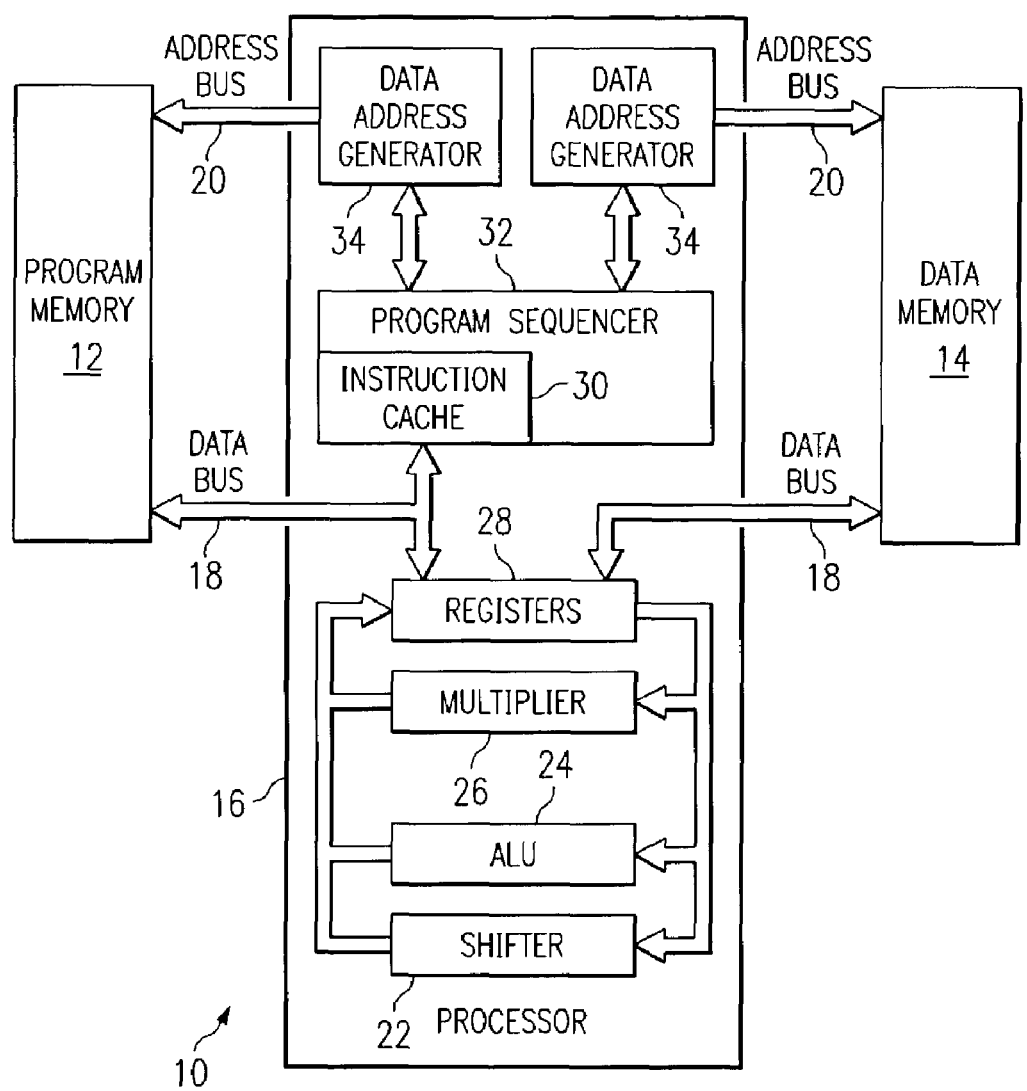
FIG. 1 illustrates an example processor system.

FIG. 1 illustrates an example processor system 10, which may include a digital signal processor (DSP). Although a particular processor system 10 is described and illustrated, the present invention contemplates any suitable processor system 10 including any suitable architecture. Processor system 10 may include program memory 12, data memory 14, and processor 16. Program memory 12 may be used to store program instructions for operations executed by processor 16, and data memory 14 may be used to store data used in operations executed by processor 16. Data (which may include program instructions, data used in operations executed by processor 16, or any other suitable data) may be communicated between processor 16 and program memory 12 and between processor 16 and data memory 14 using data buses 18, which may include any suitable physical medium for such communication. For example, data buses 18 may include one or more wires coupling processor 16 to program memory 12 and data memory 14. The number of bits that may be communicated across a data bus 18 in one clock cycle (which may include a unit of time between two adjacent pulses of a clock signal for processor system 10) may be limited. For example, in a 32-bit environment, a maximum of thirty-two bits may be communicated across each data bus 18 in one clock cycle. Data addresses (which may specify locations for data within program memory 12, data memory 14, or elsewhere and may, where appropriate, include the locations themselves) may be communicated between processor 16 and program memory 12 and between processor 16 and data memory 14 using address buses 20, which may include any suitable physical medium for such communication. For example, address buses 20 may include one or more wires coupling processor 16 with program memory 12 and data memory 14. Similar to data buses 18, the number of bits that may be communicated across an address bus 20 in one clock cycle may be limited.

Processor 16 may execute mathematical, logical, and any other suitable operations and may, for example only and not by way of limitation, include one or more shifters 22, arithmetic-logic units (ALUs) 24, multipliers 26, data registers 28, instruction caches 30, program sequencers 32, and data address generators 34. Although a particular processor 16 is described and illustrated, the present invention contemplates any suitable processor 16 including any suitable components. Shifter 22 may be used to left- or right-shift data units and perform other suitable tasks. ALU 24 may be used for addition, subtraction, absolute value operations, logical operations (such as, for example, AND, OR, NAND, NOR, and NOT operations), and other suitable tasks. Multiplier 26 may be used for multiplication and other suitable tasks. In a 32-bit environment, shifter 22, ALU 24, and multiplier 26 may each process a maximum of thirty-two bits in one clock cycle. For example, ALU 24 may in one clock cycle add numbers that include at most thirty-two bits. To add numbers that include more than thirty-two bits, the numbers may be divided into parts that each include thirty-two or fewer bits and added in parts.

Registers 28 may include a number of memory locations for storing intermediate operation results, flags for program control, and the like. For example, registers 28 may include one or more general data registers, temporary registers, condition code registers (CCRs), status registers (SRs), address registers, and other suitable registers. In a 32-bit environment, each register 28 may be used to store a maximum of thirty-two bits. Instruction cache 30 may be used to store one or more program instructions for recurring operations. For example, program instructions for one or more operations that are part of a loop of operations executed by processor 16 may be stored using instruction cache 30 such that program memory 12 need not be accessed each time a program instruction for one or more of the operations is to be executed. Program sequencer 32 may direct the execution of operations by processor 16 and perform other suitable tasks. Data address generators 34 may communicate addresses to program memory 12 and data memory 14 specifying memory locations within program memory 12 and data memory 14 from which data may be read and to which data may be written. Although particular components of processor 16 are described as performing particular tasks, any suitable components of processor 16, alone or in combination, may perform any suitable tasks. In addition, although the components of processor 16 are described and illustrated as separate components, any suitable component of processor 16 may be wholly or partly incorporated into one or more other components of processor 16.

Sums of 64-bit numbers may be calculated by processor system 10. Equations for such calculations may include the following:

$$Y = X1 + X2 + X3 + \ldots + Xn$$

Y may include a 64-bit number, and X1 through Xn may also include 64-bit numbers. Y and X1 through Xn may be stored in memory locations within data memory 14, elsewhere within processor system 10, or outside processor system 10.

In a 32-bit environment, sums of 64-bit numbers have traditionally been calculated according to the following algorithm, which may be called "summation by parts." The least significant thirty-two bits of the first 64-bit number are added to the least significant thirty-two bits of the second 64-bit number. The resulting sum includes a carry (which includes either a one or a zero) and the least significant thirty-two bits of a first 64-bit intermediate sum. The carry and the most significant thirty-two bits of the second 64-bit number are then added to the most significant thirty-two bits of the first 64-bit number, and the resulting sum includes the most significant thirty-two bits of the first 64-bit intermediate sum. The least significant thirty-two bits of the first 64-bit intermediate sum are then added to the least significant thirty-two bits of the third 64-bit number, and the resulting sum includes a carry and the least significant thirty-two bits of a second 64-bit intermediate sum. The carry and the most significant thirty-two bits of the third 64-bit number are then added to the most significant thirty-two bits of the first 64-bit intermediate sum, and the resulting sum includes the most significant thirty-two bits of the second 64-bit intermediate sum. The least significant thirty-two bits of the second 64-bit intermediate sum are then added to the least significant thirty-two bits of the fourth 64-bit number, and the resulting sum includes a carry and the least significant thirty-two bits of a third 64-bit intermediate sum. The carry and the most significant thirty-two bits of the fourth 64-bit number are then added to the most significant thirty-two bits of the second 64-bit intermediate sum, and the resulting sum includes the most significant thirty-two bits of the third 64-bit intermediate sum. This continues until the least and most significant thirty-two bits of the final 64-bit number are added to the least and most significant thirty-two bits of the preceding 64-bit intermediate sum, respectively. The final resulting sums include the least and most significant thirty-two bits of the sum of the 64-bit numbers.

Such an algorithm may be described as follows:

```
RegA(low32)   = X1(low32)
RegB(high32)  = X1(high32)
RegA(low32)   = RegA(low32) + X2(low32), C = 1 if overflow,
                else C = 0
RegB(high32)  = RegB(high32) + X2(high32) + C
RegA(low32)   = RegA(low32) + X3(low32), C = 1 if overflow,
                else C = 0
RegB(high32)  = ReqB(high32) + X3(high32) + C
        .
        .
        .
RegA(low32)   = RegA(low32) + Xn(low32), C = 1 if overflow,
                else C = 0
RegB(high32)  = RegB(high32) + Xn(high32) + C
Y(low32)      = RegA(low32)
Y(high32)     = RegB(high32)
```

RegA and RegB may include the least significant thirty-two bits and the most significant thirty-two bits, respectively, of the 64-bit intermediate results, and may be stored in registers 28. X1 (low32) and X1 (high32) may include the least significant thirty-two bits and the most significant thirty-two bits, respectively, of the first 64-bit number of the 64-bit numbers, X2 (low32) and X2 (high32) may include the least significant thirty-two bits and the most significant thirty-two bits, respectively, of the second 64-bit number of the 64-bit numbers, and so on, and may be stored in memory locations within data memory 14. Y (low 32) and Y(high32) may include the least and most significant thirty-two bits, respectively, of the sum of the 64-bit numbers and may be stored in memory locations within data memory 14. A drawback of such an algorithm is that two registers 28, RegA and RegB, are required to store 64-bit intermediate results.

In particular embodiments, sums of 64-bit numbers may be calculated using a single register 28 and an overflow counter, which may be stored in a status register 28 within processor 16 or any other suitable location within or outside processor system 10. In such embodiments, the least significant thirty-two bits of the sum of a 64-bit numbers may be calculated and generated carries may be recorded using the overflow counter (which may be incremented by one every time a carry is generated). The most significant thirty-two bits of the sum of the 64-bit numbers may then be calculated, taking into account carries from the calculation of the least significant thirty-two bits of the sum of the 64-bit numbers recorded using the overflow counter. The overflow counter may be stored in one or more status registers 28 or other suitable locations within or outside processor system 10. The overflow counter may include any suitable number of bits, which number may determine the number of sequential additions the overflow counter may accommodate. For example, a 6-bit overflow counter may accommodate $2^6$ (sixty-four) sequential additions. An algorithm for calculating sums of 64-bit numbers using an overflow counter may be described as follows:

```
; Calculate Low Thirty-Two Bits
OVCU = 0
RegA(low32)   =   X1(low32)
RegA(low32)   =   RegA(low32) + X2(low32), increment OVCU if
                  overflow
RegA(low32)   =   RegA(low32) + X3(low32), increment OVCU if
                  overflow
       .
       .
       .
RegA(low32)   =   RegA(low32) + Xn(low32), increment OVCU if
                  overflow
Y(low32) = RegA(low32)
; Calculate High Thirty-Two Bits
RegA = OVCU
RegA(high32)  =   RegA(high32) + X1(high32)
RegA(high32)  =   RegA(high32) + X2(high32)
RegA(high32)  =   RegA(high32) + X3(high32)
       .
       .
       .
RegA(high32)  =   RegA(high32) + Xn(high32)
Y(high32) = RegA(high32)
```

RegA may be stored in a register 28 or other suitable location within or outside processor system 10. X1 (low32) and X1 (high32) may include the least significant thirty-two bits and the most significant thirty-two bits, respectively, of the first 64-bit number of the 64-bit numbers, X2 (low32) and X2 (high32) may include the least significant thirty-two bits and the most significant thirty-two bits, respectively, of the second 64-bit number of the 64-bit numbers, and so on. These bits may be stored in memory locations within data memory 14, elsewhere within processor system 10, or outside processor system 10. Y (low 32) and Y (high32) may include the least and most significant thirty-two bits, respectively, of the sum of the 64-bit numbers and may be stored in memory locations within data memory 14, elsewhere within processor system 10, or outside processor system 10. Such an algorithm may require only one register for storing intermediate sums and may enable the use of repeat operations, which may reduce code size and improve processor performance. Such an algorithm, in particular embodiments, may also be described as follows:

```
; Calculate Low Thirty-Two Bits
RegA(low32) = *Source(low32);
RPT #N | | ADDUL RegA,*Source(low32)++
                                  ; // Increment OVCU if overflow
Y(low32) = RegA;
;Calculate High Thirty-Two Bits
RegA(high32) = OVCU;
RPT #N | | ADDL RegA,*Source(high32)++;
Y(high32) = RegA;
```

Although sums of 64-bit numbers calculated in a 32-bit environment have been described, the present invention contemplates sums of numbers of any suitable bit-length calculated in any suitable environment where the size of the numbers exceeds the size of one of more ALUs 24 or other components of a processor system 10. For example, the algorithm described above for calculating sums of 64-bit numbers in a 32-bit environment may be used to calculate sums of 128-bit numbers in a 64-bit environment. Although sums of numbers have been described, the present invention contemplates any suitable operations (which may include additions, subtractions, or both). For example, numbers may be subtracted according to the algorithm described above and generated borrows may be recorded using the overflow counter (which may be decremented by one every time a borrow is generated).

Figure 2:
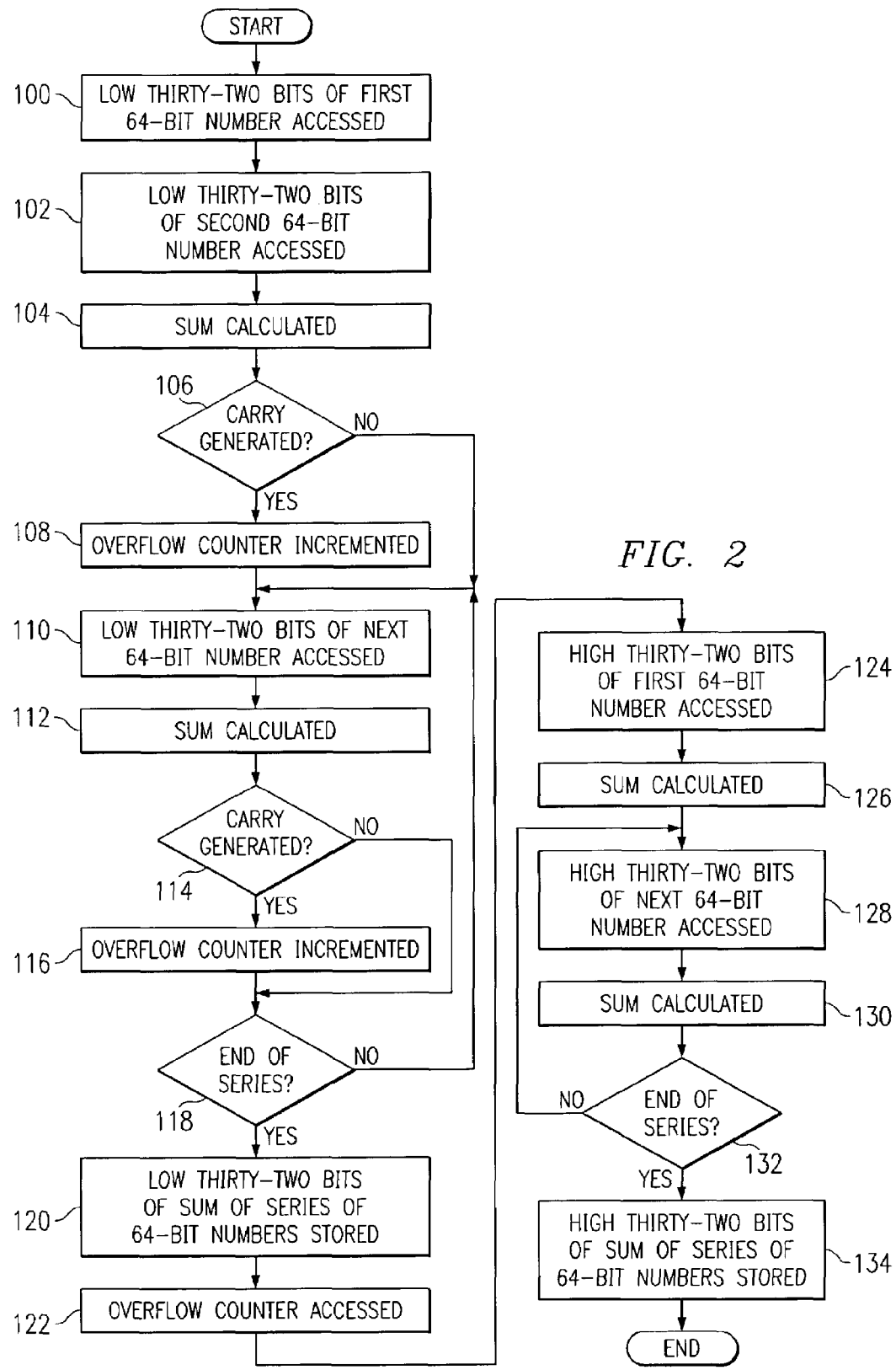
FIG. 2 illustrates an example method for calculating a sum of 64-bit numbers in a 32-bit environment using an overflow counter.

FIG. 2 illustrates an example method for calculating a sum of 64-bit numbers in a 32-bit environment using an overflow counter. The method begins at step 100, where the least significant thirty-two bits of the first 64-bit number of the 64-bit number are accessed. As described above, the 64-bit numbers may be stored in memory locations within data memory 15 or any other suitable location. At step. 102, the least significant thirty-two bits of the second 64-bit number are accessed. At step 104, the least significant thirty-two bits of the first 64-bit number are added to the least significant thirty-two bits of the second 64-bit number, resulting in an intermediate 32-bit sum for the least significant thirty-two bits of the sum of 64-bit numbers. As described above, the intermediate 32-bit sum may be stored in a register 28 or any other suitable location. At step 106, if a carry was generated by the addition of the least significant thirty-two bits of the first 64-bit number to the least significant thirty-two bits of the second 64-bit number, the method proceeds to step 108. At step 108, an overflow counter is incremented to record the generated carry. As described above, the overflow counter may be stored in a status register 28 or any other suitable location. At step 106, if a carry was not generated by the addition of the least significant thirty-two bits of the first 64-bit number to the least significant thirty-two bits of the second 64-bit number, the method proceeds to step 110.

At step 110, the least significant thirty-two bits of the next 64-bit number are accessed. At step 112, the least significant thirty-two bits of the 64-bit number accessed at step 110 are added to the intermediate 32-bit sum for the least significant thirty-two bits of the sum of 64-bit numbers. At step 114, if a carry was generated by the addition of the least significant thirty-two bits of the 64 number accessed at step 110 to the intermediate 32-bit sum for the least significant thirty-two bits of the sum of 64-bit numbers, the method proceeds to step 116. At step 116, the overflow counter is incremented to record the generated carry. At step 114, if a carry was not generated by the addition of the least significant thirty-two bits of the 64-bit number accessed at step 110 to the intermediate 32-bit sum for the least significant thirty-two bits of the sum of 64-bit numbers, the method proceeds to step 118. At step 118, if the least significant thirty-two bits of the final 64-bit number have not been added to the intermediate 32-bit sum for the least significant thirty-two bits of the sum of 64-bit numbers, the method returns to step 110. At step 118, if the least significant thirty-two bits of the final 64-bit number have been added to the intermediate 32-bit sum for the least significant thirty-two bits of the sum of 64-bit numbers, the method proceeds to step 120. At step 120, the intermediate 32-bit sum for the least significant thirty-two bits of the sum of 64-bit numbers (which, after the addition of the least significant thirty-two bits of the final 64-bit number, includes the least significant thirty-two bits of the sum of the 64-bit numbers) is stored.

At step 122, the overflow counter is accessed. At step 124, the most significant thirty-two bits of the first 64-bit number are accessed. At step 126, the most significant thirty-two bits of the first 64-bit number are added to the overflow counter, resulting in an intermediate 32-bit sum for the most significant thirty-two bits of the sum of the 64-bit numbers. As described above, the intermediate 32-bit sum for the most significant thirty-two bits of the sum of the 64-bit numbers may be stored in the same register in which the intermediate 32-bit sum for the least significant thirty-two bits of the sum of the 64-bit numbers was stored. At step 128, the most significant thirty-two bits of the next 64-bit number are accessed. At step 130, the most significant thirty two bits of the 64-bit number accessed at step 128 are added to the intermediate 32-bit sum for the most significant thirty-two bits of the sum of the 64-bit numbers. At step 132, if the most significant thirty-two bits of the final 64-bit number have not been added to the intermediate 32-bit sum for the most significant thirty-two bits of the sum of the 64-bit numbers, the method returns to step 128. At step 132, if the most significant thirty-two bits of the final 64-bit number have been added to the intermediate 32-bit sum for the most significant thirty-two bits of the sum of the 64-bit numbers, the method proceeds to step 134. At step 134, the intermediate sum for the most significant thirty-two bits of the sum of the 64-bit numbers (which, after the addition of the most significant thirty-two bits of the final 64-bit number, includes the most significant thirty-two bits of the sum of the 64-bit numbers) is stored, at which point the method ends.

Although a method for calculating the sum of 64-bit numbers in a 32-bit environment has been described, the present invention, as described above, contemplates sums of numbers of any suitable bit-length calculated in any suitable environment where the size of the numbers exceeds the size of one of more ALUs 24 or other components of a processor system 10. Additionally, although a method for calculating the sum of numbers has been described, the present invention, as described above, contemplates any suitable operations (which may include additions, subtractions, or both).

Although the present invention has been described with several embodiments, sundry changes, substitutions, variations, alterations, and modifications may be suggested to one skilled in the art, and it is intended that the invention may encompass all such changes, substitutions, variations, alterations, and modifications falling within the spirit and scope of the appended claims.

What is claimed is:

1. A method of operating a 32-bit processor to perform sum of 64-bit numbers in a 64-bit processor environment, the method comprising:

performing a first sum of numbers operation on a least significant portion of a first number and least significant portions of a plurality of numbers by:

a) adding the least significant portion of the first number to a least significant portion of another number from the plurality of numbers, wherein the sum is stored in a first storage location, wherein the first storage location is a register;

b) incrementing an overflow counter if a carry is generated by adding the least significant portions of the two numbers, wherein the overflow counter is stored in a status register;

c) adding a least significant portion of a next number from the plurality of numbers to the sum stored in the first storage location, wherein the resulting sum is stored back into the first storage location;

d) incrementing the overflow counter if a carry is generated by adding the least significant portion of the next number to the sum in the first storage location;

e) performing steps c) and d) until each of the least significant portions of the plurality of numbers has been added;

f) moving the sum in the first storage location into a second storage location, wherein the second storage location is one or more registers or one or more memory locations; and performing a second sum of numbers operation on a most significant portion of the first number and most significant portions of the plurality of numbers.

2. The method of claim 1, wherein moving the sum into the second storage location further comprises moving the sum in the first storage location into a least significant portion of the second storage location.

3. The method of claim 1, wherein performing the second sum of numbers operation comprises:

g) adding the overflow counter to the most significant portion of the first number, wherein the sum is stored in the first storage location;

h) adding a most significant portion of the next number from the plurality of numbers to the sum stored in the first storage location, wherein the resulting sum is stored back into the first storage location;

i) performing step h) until each of the most significant portions of the plurality of numbers has been added; and j) moving the sum in the first storage location into the second storage location, wherein moving the sum into the second storage location further comprises moving the sum in the first storage location into a most significant portion of the second storage location.

4. The method of claim 3, wherein each of the plurality of numbers is a product of a constant from a plurality of constants and the first number.

5. The method of claim 3, wherein each of the plurality of numbers is stored in one or more memory locations.

6. The method of claim 3, wherein each of the plurality of numbers is 64-bits in length.

7. The method of claim 3, wherein the most significant portion is 32-bits in length and the least significant portion is 32-bits in length.

8. The method of claim 1, wherein the processor is a digital signal processor (DSP).

9. A method of operating a 32-bit processor to perform difference of 64-bit numbers in a 64-bit processor environment, the method comprising:
performing a first difference of numbers operation on a least significant portion of a first number and least significant portions of a plurality of numbers by:
a) subtracting the least significant portion of the first number from a least significant portion of another number from the plurality of numbers, wherein the difference is stored in a first storage location, wherein the first storage location is a register;
b) decrementing an overflow counter if a borrow is generated by the subtraction of the least significant portions of the two numbers, wherein the overflow counter is stored in a status register;
c) subtracting a least significant portion of a next number from the plurality of numbers from the difference stored in the first storage location, wherein the resulting difference is stored back into the first storage location;
d) decrementing the overflow counter if a borrow is generated by the subtraction of the least significant portion of the next number from the difference in the first storage location;
e) performing steps c) and d) until each of the least significant portions of the plurality of numbers has been subtracted;
f) moving the difference in the first storage location into a second storage location, wherein the second storage location is one or more registers or one or more memory locations; and
performing a second difference of numbers operation on a most significant portion of the first number and most significant portions of the plurality of numbers.

10. The method of claim 9, wherein moving the difference into the second storage location further comprises moving the difference in the first storage location into a least significant portion of the second storage location.

11. The method of claim 9, wherein performing the second difference of numbers operation comprises:
g) subtracting the overflow counter from the most significant portion of the first number, wherein the difference is stored in the first storage location;
h) subtracting a most significant portion of the next number from the plurality of numbers from the difference stored in the first storage location, wherein the resulting difference is stored back into the first storage location;
i) performing step h) until each of the most significant portions of the plurality of numbers has been subtracted; and
j) moving the difference in the first storage location into the second storage location, wherein moving the difference into the second storage location further comprises moving the difference in the first storage location into a most significant portion of the second storage location.

12. The method of claim 11, wherein each of the plurality of numbers is a product of a constant from a plurality of constants and the first number.

13. The method of claim 11, wherein each of the plurality of numbers is stored in one or more memory locations.

14. The method of claim 11, wherein each of the plurality of numbers is 64-bits in length.

15. The method of claim 11, wherein the most significant portion is 32-bits in length and the least significant portion is 32-bits in length.

16. The method of claim 9, wherein the processor is a digital signal processor (DSP).

17. A computer-readable storage medium for storing instructions for operating a 32-bit processor to perform sum of 64-bit numbers operations in a 64-bit processor environment, wherein the instructions, if executed, enable the processor to:
perform a first sum of numbers operation on a least significant portion of a first number and least significant portions of a plurality of numbers to:
a) add the least significant portion of the first number to a least significant portion of another number from the plurality of numbers, wherein the sum is stored in a first storage location, wherein the first storage location is a register;
b) increment an overflow counter if a carry is generated by adding the least significant portions of the two numbers, wherein the overflow counter is stored in a status register;
c) add a least significant portion of a next number from the plurality of numbers to the sum stored in the first storage location, wherein the resulting sum is stored back into the first storage location;
d) increment the overflow counter if a carry is generated by adding the least significant portion of the next number to the sum in the first storage location;
e) perform steps c) and d) until each of the least significant portions of the plurality of numbers has been added;
f) move the sum in the first storage location into a second storage location, wherein the second storage location is one or more registers or one or more memory locations; and
perform a second sum of numbers operation on a most significant portion of the first number and most significant portions of the plurality of numbers.

18. A computer-readable storage medium for storing instructions for operating a 32-bit processor to perform difference of 64-bit numbers operations in a 64-bit processor environment, wherein the instructions, if executed, enable the processor to:
perform a first difference of numbers operation on a least significant portion of a first number and least significant portions of a plurality of numbers to:
a) subtract the least significant portion of the first number from a least significant portion of another number from the plurality of numbers, wherein the difference is stored in a first storage location, wherein the first storage location is a register;
b) decrement an overflow counter if a borrow is generated by the subtraction of the least significant portions of the two numbers, wherein the overflow counter is stored in a status register;
c) subtract a least significant portion of a next number from the plurality of numbers from the difference stored in the first storage location, wherein the resulting difference is stored back into the first storage location;

d) decrement the overflow counter if a borrow is generated by the subtraction of the least significant portion of the next number from the difference in the first storage location;

e) perform steps c) and d) until each of the least significant portions of the plurality of numbers has been subtracted;

f) move the difference in the first storage location into a second storage location, wherein the second storage location is one or more registers or one or more memory locations; and perform a second difference of numbers operation on a most significant portion of the first number and most significant portions of the plurality of numbers.

* * * * *

UNITED STATES PATENT AND TRADEMARK OFFICE
CERTIFICATE OF CORRECTION

PATENT NO. : 7,590,677 B2  Page 1 of 1
APPLICATION NO. : 10/349224
DATED : September 15, 2009
INVENTOR(S) : Alexander Tessarolo It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 885 days.

Signed and Sealed this

Twenty-first Day of September, 2010

David J. Kappos
*Director of the United States Patent and Trademark Office*